United States Patent
Takamiya

(10) Patent No.: US 9,641,742 B2
(45) Date of Patent: May 2, 2017

(54) IMAGING DEVICE AND METHOD OF DRIVING IMAGING DEVICE

(71) Applicant: CANON KABUSHIKI KAISHA, Tokyo (JP)

(72) Inventor: Hideaki Takamiya, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/049,365

(22) Filed: Feb. 22, 2016

(65) Prior Publication Data
US 2016/0255267 A1 Sep. 1, 2016

(30) Foreign Application Priority Data

Feb. 26, 2015 (JP) ................. 2015-036804

(51) Int. Cl.
*H04N 5/232* (2006.01)
*G02B 7/34* (2006.01)
*G02B 7/10* (2006.01)
*H04N 5/225* (2006.01)
(Continued)

(52) U.S. Cl.
CPC ......... *H04N 5/23212* (2013.01); *G02B 7/102* (2013.01); *G02B 7/34* (2013.01); *H04N 5/2256* (2013.01); *H04N 5/23216* (2013.01); *H04N 5/23245* (2013.01); *H04N 5/23293* (2013.01); *H04N 5/23296* (2013.01); *H04N 5/3572* (2013.01); *H04N 5/3696* (2013.01)

(58) Field of Classification Search
CPC ........... H04N 5/23212; H04N 5/23209; H04N 5/23296; H04N 5/23216; H04N 5/23245; H04N 5/2254; H04N 5/23248; H04N 5/2259; G02B 7/34; G02B 7/09; G02B 7/102; G02B 7/36; G02B 7/38; G03B 13/36
See application file for complete search history.

(56) References Cited

U.S. PATENT DOCUMENTS 7,822,336 B2 * 10/2010 Nakai ................. H04N 5/23212
348/362
8,525,916 B2 * 9/2013 Okamoto ........... H04N 5/23209
348/240.3
(Continued)

FOREIGN PATENT DOCUMENTS

JP 2012-173531 A 9/2012
JP 2013-178323 A 9/2013

*Primary Examiner* — Michael Osinski
(74) *Attorney, Agent, or Firm* — Cowan, Liebowitz & Latman, P.C.

(57) ABSTRACT

An imaging device includes an acquisition unit acquiring a defocus amount for an optical image which is obtained by an imaging element, a recording unit recording a driving speed of lens with the defocus amount in response to an instruction from a user, wherein the lens is controlled, for adjusting a position at which the optical image is focused, by a lens driving unit, an information generating unit generating lens driving information specifying a relation between the defocus amount and the lens driving speed, and a control unit controlling the lens driving unit so as to move the lens to a position at which the optical image is in-focused to the object at a predetermined speed specified in the lens driving information as a driving speed corresponding to the defocus amount acquired by the acquisition unit.

9 Claims, 16 Drawing Sheets

(51) Int. Cl.
*H04N 5/357* (2011.01)
*H04N 5/369* (2011.01)

(56) References Cited

U.S. PATENT DOCUMENTS

| | | | | |
|---|---|---|---|---|
| 8,860,874 B2* | 10/2014 | Nishiguchi | ............. | G02B 7/36 |
| | | | | 348/208.99 |
| 9,160,930 B2* | 10/2015 | Ishii | ........................ | G02B 7/08 |
| 9,277,114 B2* | 3/2016 | Kudo | ................ | H04N 5/23212 |
| 9,398,206 B2* | 7/2016 | Uenishi | ............. | H04N 5/23212 |
| 9,432,567 B2* | 8/2016 | Yamasaki | .......... | H04N 5/23212 |
| 2010/0141801 A1* | 6/2010 | Okamoto | ........... | H04N 5/23209 |
| | | | | 348/240.3 |
| 2011/0261251 A1* | 10/2011 | Okamoto | ............... | G02B 7/102 |
| | | | | 348/345 |
| 2012/0212661 A1* | 8/2012 | Yamaguchi | ............. | G02B 7/38 |
| | | | | 348/346 |
| 2014/0184888 A1* | 7/2014 | Won | ................... | H04N 5/23212 |
| | | | | 348/352 |
| 2014/0340562 A1* | 11/2014 | Kudo | ................ | H04N 5/23212 |
| | | | | 348/345 |
| 2015/0042867 A1* | 2/2015 | Shiono | .................... | G03B 13/32 |
| | | | | 348/348 |
| 2016/0150152 A1* | 5/2016 | Nakamaru | ............ | G03B 13/36 |
| | | | | 348/354 |
| 2016/0234424 A1* | 8/2016 | Ito | ..................... | H04N 5/23212 |

* cited by examiner

IMAGING DEVICE AND METHOD OF DRIVING IMAGING DEVICE

BACKGROUND OF THE INVENTION

Field of the Invention

The present invention relates to an imaging device and a method of driving imaging device.

Description of the Related Art

In an imaging device, when a still image is photographed, generally, a focus adjustment is performed by using an auto focus (hereinbelow, referred to as "AF") which has widely been known hitherto and the photographing is performed. On the other hand, when a moving image is photographed, since all actions which are performed when a focus is adjusted to a certain object to be photographed are recorded as a part of the moving image, there is also a case where it is desired to perform a focus adjustment by a manual focus (hereinbelow, referred to as "MF") without using AF.

By performing the focus adjustment by MF, the user can photograph a video image while moving a lens at an arbitrary speed up to an in-focus position. However, in dependence on a photographing situation, there can be also a case where it is difficult to perform the focus adjustment by MF or MF cannot be used. In such a case, although such a request that the user wants to photograph by using AF is also presumed, the focus adjustment can be performed only by a uniform lens driving which has been predetermined on the camera side.

Under such a background, Japanese Patent Application Laid-Open No. 2012-173531 proposes an imaging device which performs such focus control that a driving speed of a focus lens is decided based on operation information of the user and the focus lens is moved at the decided focus lens driving speed. Japanese Patent Application Laid-Open No. 2013-178323 proposes an imaging device in which an in-focus speed of the lens is changed based on a judgment of the user.

However, according to the techniques disclosed in Japanese Patent Application Laid-Open No. 2012-173531 and Japanese Patent Application Laid-Open No. 2013-178323, such an operation that the lens driving speed to the object is raised or reduced or the like is merely performed. Therefore, for example, such a fine desire of the user that although the lens driving speed is raised at the time of a large blur, at a position near an in-focus point, the lens driving speed is reduced and the lens is smoothly in-focused cannot be reflected. Unlike AF of the still image, according to AF in the moving image, since the lens driving itself until the in-focus state is inherently reflected, the lens driving itself at the time of AF becomes a part of a product. Therefore, if a fine setting according to a scene to be photographed can be made, it is desirable when a video image closer to a user's desired video image is photographed.

SUMMARY OF THE INVENTION

An object of the present invention is to provide an imaging device which can perform a focus adjustment by AF by a lens driving of desired various methods of the user and a method of driving the imaging device.

According to an aspect of the present invention, there is provided an imaging device including an acquisition unit configured to acquire a defocus amount for an optical image which is obtained by an imaging element, a recording unit configured to record a driving speed of lens in association with the defocus amount in response to an instruction from a user, wherein the lens is controlled, for adjusting a position at which the optical image is focused, by a lens driving unit, an information generating unit configured to generate lens driving information specifying a relation between the defocus amount and the driving speed of the lens based on information of the driving speed recorded by the recording unit, and a control unit configured to control the lens driving unit so that the lens is moved to a position at which the optical image is in-focused to the object at a predetermined speed specified in the lens driving information as a driving speed corresponding to the defocus amount acquired by the acquisition unit.

According to another aspect of the present invention, there is provided a method of driving an imaging device having an imaging element configured to obtain an image of an object from an optical image of the object, a lens driving unit configured to control a lens for adjusting a position at which the optical image is focused, and an acquisition unit configured to acquire a defocus amount of the optical image, the method including recording a driving speed of the lens in association with the defocus amount in response to an instruction from a user, generating lens driving information specifying a relation between the defocus amount and the driving speed based on information of the recorded driving speed, and acquiring the defocus amount of the optical image by the acquisition unit and moving the lens to a position at which the optical image is in-focused to the object at a predetermined speed specified in the lens driving information as a driving speed of the lens corresponding to the detected defocus amount.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

An imaging device and a method of driving the imaging device according to the first embodiment of the present invention will now be described in detail with reference to FIGS. 1 to 12.

Figure 1:
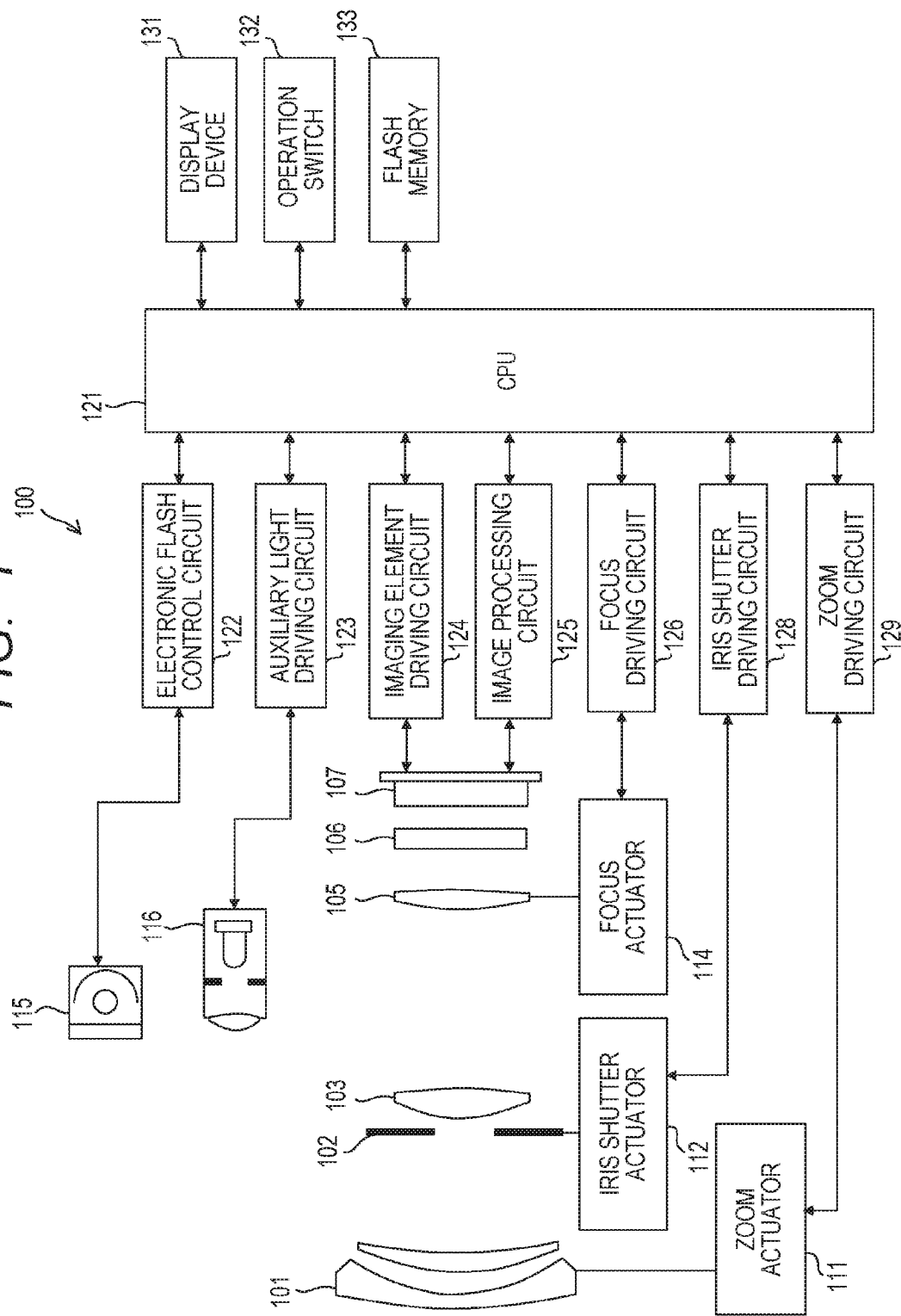
FIG. 1 is a schematic constructional diagram of an imaging device according to a first embodiment of the present invention.

First, a general structure of the imaging device according to the present embodiment will be described with reference to FIG. 1. FIG. 1 is a schematic constructional diagram illustrating the imaging device according to the present embodiment.

As illustrated in FIG. 1, an imaging device (camera) 100 according to the present embodiment includes an image forming optical system including a first lens group 101, an iris shutter 102, a second lens group 103, a third lens group 105, and an optical low pass filter 106. The imaging device 100 also includes an imaging element 107, a zoom actuator 111, an iris shutter actuator 112, a focus actuator 114, an object illumination electronic flash 115, and an AF auxiliary light unit 116. The imaging device 100 also includes a CPU 121, an electronic flash control circuit 122, an auxiliary light driving circuit 123, an imaging element driving circuit 124, an image processing circuit 125, a focus driving circuit 126, an iris shutter driving circuit 128, and a zoom driving circuit 129. The imaging device 100 also includes a display device 131, an operation switch 132, and a flash memory 133.

The first lens group 101, the iris shutter 102, the second lens group 103, the third lens group 105, and the optical low pass filter 106 are arranged in this order from an object side along an optical axis and construct the image forming optical system. The image forming optical system is an optical system for forming an optical image of the object. The first lens group 101 is a lens group arranged in a forefront portion (object side) of the image forming optical system and is held so as to be movable forward and backward along the optical axis direction. The iris shutter 102 has not only a function for performing a light amount adjustment upon photographing by adjusting its aperture diameter but also a function as a shutter for adjusting an exposure time (i.e., shutter speed) upon photographing of a still image. The iris shutter 102 and the second lens group 103 integratedly move forward and backward along the optical axis direction and realize a magnifying function (zoom function) in an interlocking relational manner with the forward/backward operation of the first lens group 101. The third lens group 105 has a function for performing a focus adjustment by the forward/backward motion along the optical axis direction. The optical low pass filter 106 is an optical element for reducing a false color and moire of the photographed image. The imaging element 107 is an imaging element formed of a 2-dimensional CMOS photosensor and its peripheral circuits and is arranged on the image forming plane of the image forming optical system.

The zoom actuator 111 is provided to drive the first lens group 101, the second lens group 103, and the third lens group 105 so as to be movable forward and backward along the optical axis direction by rotating a cam barrel (not illustrated), thereby executing the zooming operation. The iris shutter actuator 112 is provided to adjust a photographing light amount by controlling the aperture diameter of the iris shutter 102 and control the exposure time upon photographing of a still image. The focus actuator 114 is provided to perform a focus adjustment by moving the third lens group 105 so as to be movable forward and backward along the optical axis direction.

The object illumination electronic flash 115 is a light source to illuminate the object upon photographing. Although a flash illuminating device using a Xenon tube is desirable as the object illumination electronic flash 115, an illuminating device having an LED which continuously emits light may be used. The AF auxiliary light unit 116 is provided to project an image of a mask having a predetermined aperture pattern onto a field through a projecting lens, thereby improving a focus detecting performance to a dark object or an object of a low contrast.

The CPU 121 is a control unit (circuit, processor or the like) in the camera and is used to make various kinds of control of the camera main body. The CPU 121 has an operating unit, a ROM, a RAM, an A/D converter, a D/A converter, a communication interface circuit, and the like. On the basis of predetermined programs stored in the ROM or the like, the CPU 121 drives various circuits held in the camera and performs a series of operations such as AF, photographing, image process, recording, and the like. The CPU 121 also functions as an image processing unit, an acquisition unit, a recording unit, and an information generating unit.

The electronic flash control circuit 122 is provided to control the on/off operation of the object illumination electronic flash 115 for object illumination synchronously with the photographing operation. The auxiliary light driving circuit 123 is provided to control the on/off operation of the AF auxiliary light unit 116 synchronously with the focus detecting operation. The imaging element driving circuit 124 is provided to control the imaging operation of the imaging element 107, A/D convert an obtained image signal, and transmit to the CPU 121. The image processing circuit 125 is provided to perform processes such as γ conversion, color interpolation, JPEG compression, and the like of the image obtained by the imaging element 107.

The focus driving circuit 126 drives the focus actuator 114 on the basis of a focus detection result, drives the third lens group 105 so as to be movable forward and backward along the optical axis direction, and performs a focus adjustment. In this specification, there is also a case where the third lens group 105 and the focus actuator 114 are called "lens" and the focus driving circuit 126 is called "lens driving unit." The iris shutter driving circuit 128 is provided to drive the iris shutter actuator 112 and control an aperture of the iris shutter 102. The zoom driving circuit 129 is provided to drive the zoom actuator 111 in accordance with the zooming operation of the photographer.

The display device 131 is a display device such as an LCD or the like and is provided to display information about a photographing mode of the camera, a preview image before photographing, an image for confirmation after the photographing, an in-focus state display image at the time of focus detection, and the like. The display device 131 has a touch panel function. By directly touching a display screen of the display device 131, the user can perform various kinds of operations. The operation switch 132 is constructed by a power switch, a release (photographing trigger) switch, a zooming operation switch, a photographing mode select switch, and the like. The flash memory 133 is a detachable recording medium. The photographed images and the like can be recorded into the flash memory 133.

Figure 2:
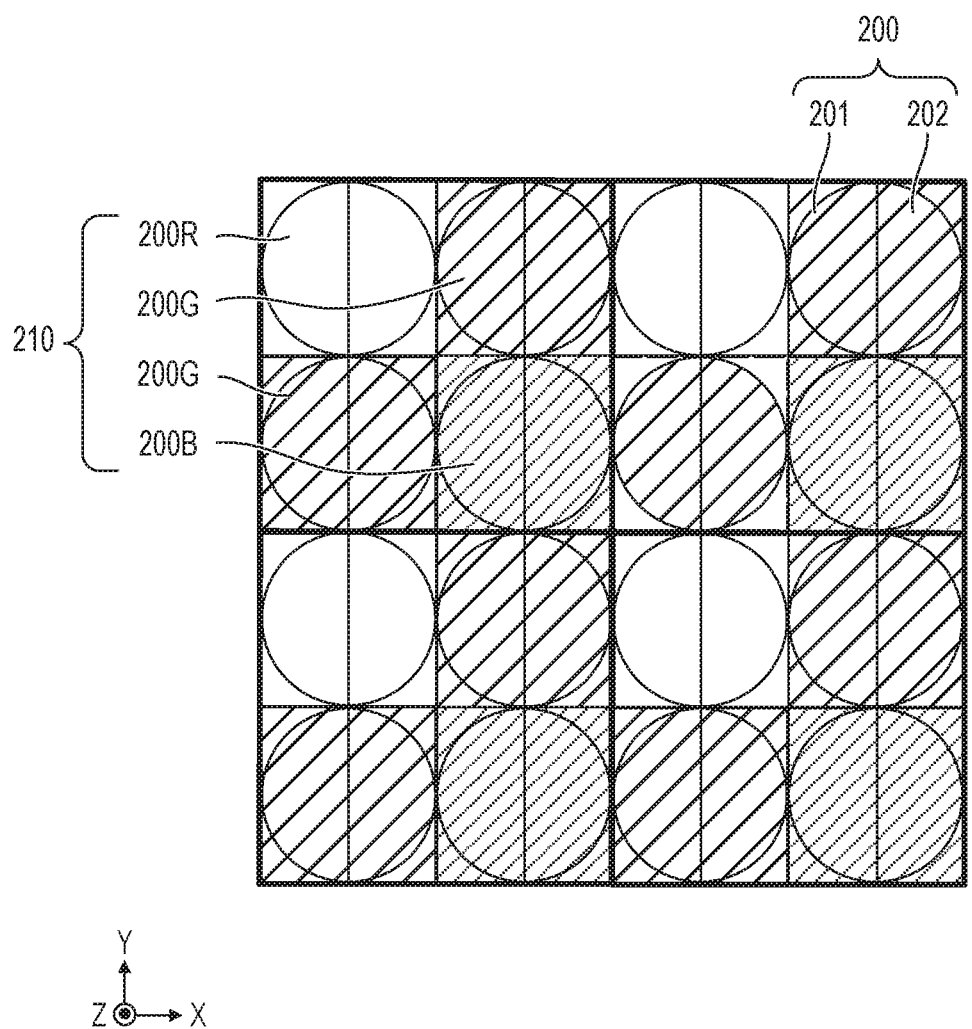
FIG. 2 is a schematic plan view illustrating an example of a pixel arrangement in an imaging element of the imaging device according to the first embodiment of the present invention.
Figure 3A:
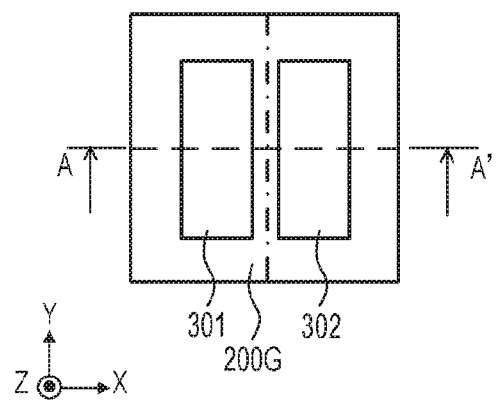
FIG. 3A is a schematic plan view of a pixel in the imaging element of the imaging device according to the first embodiment of the present invention.
Figure 3B:
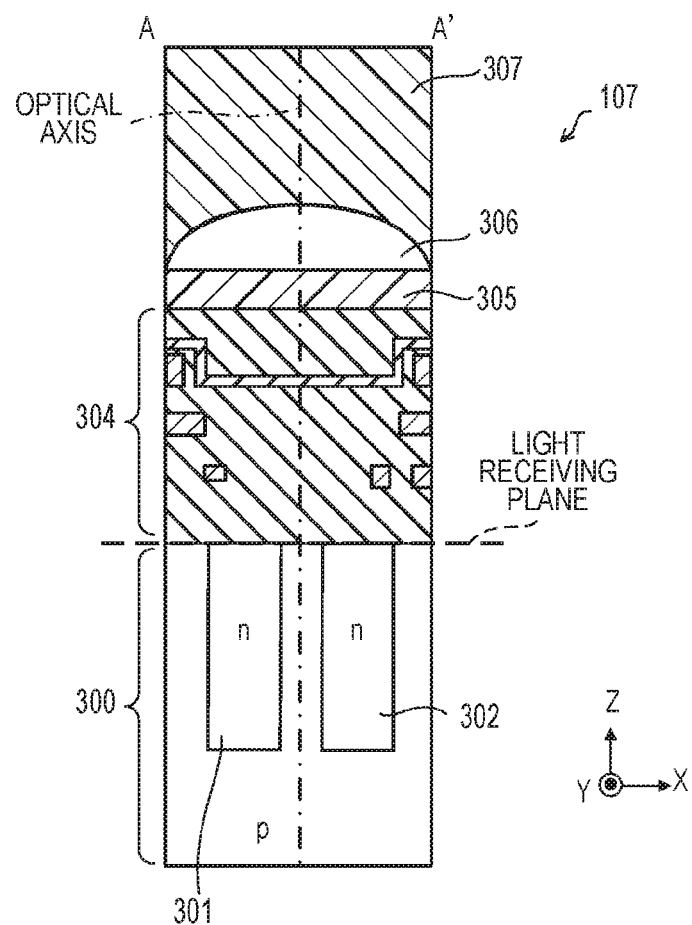
FIG. 3B is a schematic cross-sectional view of the pixel in the imaging element of the imaging device according to the first embodiment of the present invention.
Figure 4:
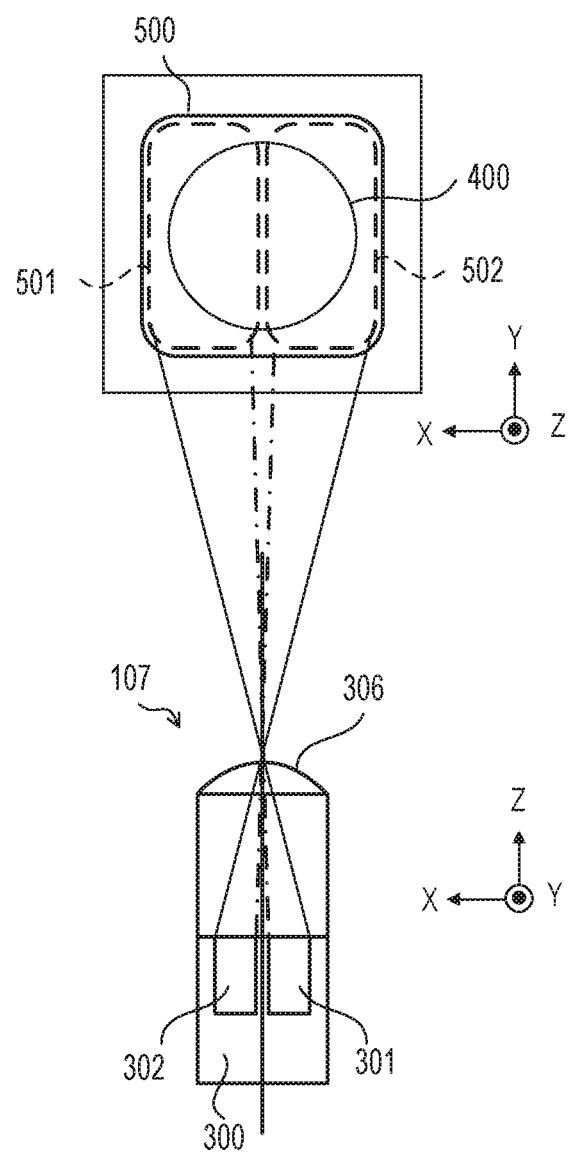
FIG. 4 is a schematic diagram for describing a correspondence relation between the pixel and a pupil division in the imaging device according to the first embodiment of the present invention.
Figure 5:
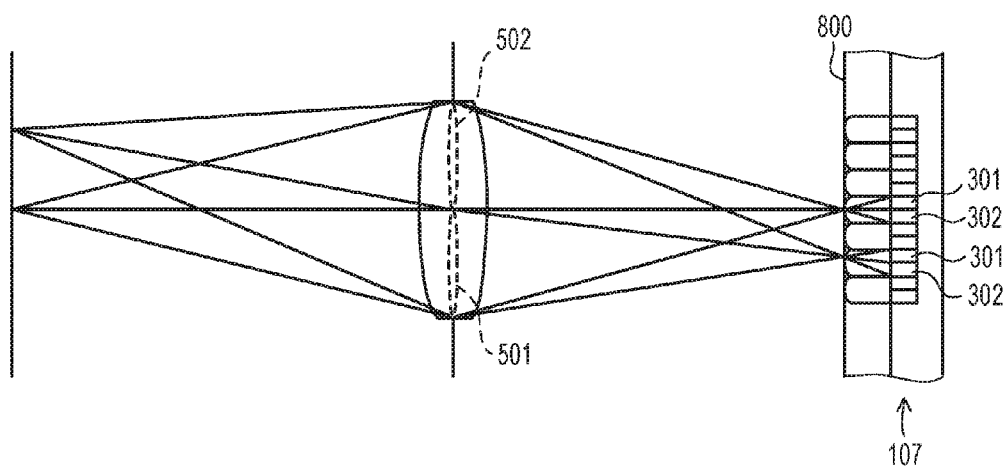
FIG. 5 is a schematic diagram for describing a correspondence relation between the imaging element and a pupil division in the imaging device according to the first embodiment of the present invention.

Subsequently, the imaging element 107 of the imaging device 100 according to the present embodiment will be described in more detail with reference to FIG. 2 to 5. FIG. 2 is a schematic plan view illustrating an example of a pixel arrangement in the imaging element of the imaging device according to the present embodiment. FIG. 3A is a plan view illustrating a structure of the imaging element of the imaging device according to the present embodiment. FIG. 3B is a cross sectional view illustrating a structure of the imaging element of the imaging device according to the present embodiment. FIG. 4 is a schematic diagram for describing a correspondence relation between the pixel and a pupil division in the imaging device according to the present embodiment. FIG. 5 is a schematic diagram for describing a correspondence relation between the imaging element and a pupil division in the imaging device according to the present embodiment.

The imaging element 107 includes an imaging area in which plural pixels are two-dimensionally arranged along the row direction and the column direction. The pixels in a range of (4 columns)×(4 rows) among the plurality of pixels (imaging pixels 200) included in the imaging area are extracted and illustrated in FIG. 2. Each imaging pixel 200 has two focus detection pixels 201 and 202 arranged in the row direction. The imaging pixel 200 is a minimum unit of the pixels which are used when the image signal is obtained. Each of the focus detection pixels 201 and 202 is a minimum unit of the pixels which are used when the focus detection signal is obtained.

In FIG. 2, a pixel group 210 of continuous (2 columns)×(2 rows) is a minimum repetition unit constructing the imaging area. The imaging area is constructed by repeatedly arranging a desired number of pixel groups 210 in the row direction and the column direction. FIG. 2 illustrates an example in which the two pixel groups 210 are arranged in the row direction and the two pixel groups 210 are arranged in the column direction, respectively. Each pixel group 210 includes a pixel 200R arranged at the upper left position, two pixels 200G arranged at the upper right position and the lower left position, and a pixel 200B arranged at the lower right position. The pixel 200R is a pixel having a spectral sensitivity of R (red). The pixel 200G is a pixel having a spectral sensitivity of G (green). The pixel 200B is a pixel having a spectral sensitivity of B (blue). As mentioned above, each of the pixels 200R, 200G, and 200B is constructed by the first focus detection pixel 201 and the second focus detection pixel 202 arranged in a matrix form of (2 columns)×(1 row).

By two-dimensionally arranging a number of pixel groups 210, the imaging signal and the focus detection signal can be obtained. As an example, a period P of the pixels (imaging pixels 200) can be set to 4 μm and the number N of pixels can be set to (5,575 columns in the horizontal direction)× (3,725 rows in the vertical direction) (=about 20,750,000 pixels). In this case, when an attention is paid to the focus detection pixels, a period $P_{AF}$ in the column direction of the focus detection pixels is equal to 2 μm and the number $N_{AF}$ of focus detection pixels is equal to (11,150 columns in the horizontal direction)×(3,725 rows in the vertical direction) (=about 41,500,000 pixels).

A plan view in the case where one pixel 200G among the plurality of pixels illustrated in FIG. 2 is seen from the light receiving plane side (+z side) of the imaging element 107 is illustrated in FIG. 3A, and a cross-sectional view in the case where a cross-sectional view taken along the line A-A' in FIG. 3A is illustrated in FIG. 3B. In this specification, for convenience of explanation, it is assumed that an explanation will be made by using an orthogonal coordinate system in which a direction which is parallel to the rows of the pixel array is set to an X axis, a direction which is parallel to the columns of the pixel array is set to a Y axis, and a direction which is parallel to an optical axis of an image forming optical system is set to a Z axis.

As illustrated in FIGS. 3A and 3B, the pixel 200G includes a semiconductor substrate 300, a multi-level interconnection layer 304 formed above the semiconductor substrate 300, and a color filter 305, a microlens 306, and a cover film 307 formed above the multi-level interconnection layer 304. A photoelectric conversion unit (a photoelectric conversion unit 301 and a photoelectric conversion unit 302) which has been divided into $N_H$ (in this instance, 2 division) regions in the X direction and has been divided into $N_V$ (in this instance, 1 division) regions in the Y direction is formed in the semiconductor substrate 300. The photoelectric conversion unit 301 corresponds to the foregoing first focus detection pixel 201 and the photoelectric conversion unit 302 corresponds to the foregoing second focus detection pixel 202, respectively.

Each of the photoelectric conversion units 301 and 302 is a photodiode including a p-type layer and an n-type layer formed in the semiconductor substrate 300. Each of the photoelectric conversion units 301 and 302 may be a p-i-n structure photodiode in which an intrinsic layer is sandwiched between a p-type layer and an n-type layer or may be a p-n junction photodiode in which the intrinsic layer is omitted in accordance with necessity.

The microlens 306 is arranged over the photoelectric conversion units 301 and 302 through the color filter 305. One microlens 306 is arranged in correspondence to each pixel (imaging pixel) 200. As for the color filter 305, spectral transmissivity may be changed every subpixel in accordance with necessity or the color filter 305 may be omitted.

Light which entered the pixel 200G is converged by the microlens 306, is spectrally dispersed by the color filter 305, and thereafter, is received by the photoelectric conversion units 301 and 302. In the photoelectric conversion units 301 and 302, pairs of electrons and holes are generated in accordance with a light reception amount and are separated in a depletion layer. After that, the electrons of negative charges are accumulated in the n-type layer and the holes are ejected to the outside of the imaging element 107 through the p-type layer connected to a constant voltage source. The electrons accumulated in the n-type layers of the photoelectric conversion units 301 and 302 are transferred to a capacitor portion (FD: floating diffusion) through transfer gates and are converted into voltage signals.

FIG. 4 illustrates a relation between a cross-section in the case where the cross-sectional view taken along the line A-A' of the pixel structure illustrated in FIG. 3A is seen from the +Y side and an exit pupil plane of an image forming optical system. In FIG. 4, in order to obtain a correspondence with a coordinate axis of the exit pupil plane, the directions of the X axis and the Y axis in the cross-sectional view are reversed as compared with those in FIG. 3B.

In FIG. 4, a first pupil partial area 501 of the first focus detection pixel 201 has an almost conjugate relation by the light receiving plane of the photoelectric conversion unit 301 whose center of gravity is decentered to the −X direction and the microlens 306 and shows a pupil area which can receive the light by the first focus detection pixel 201. In the first pupil partial area 501 of the first focus detection pixel 201, the center of gravity is decentered to the +X side on the pupil plane. A second pupil partial area 502 of the second focus detection pixel 202 has an almost conjugate relation by the light receiving plane of the photoelectric conversion unit 302 whose center of gravity is decentered to the +x direction and the microlens 306 and shows a pupil area which can receive the light by the second focus detection pixel 202. In the second pupil partial area 502 of the second focus detection pixel 202, the center of gravity is decentered to the −X side on the pupil plane.

In FIG. 4, a pupil area 500 is a pupil area which can receive the light by the whole pixel 200G in which the photoelectric conversion units 301 and 302 (the first focus detection pixel 201 and the second focus detection pixel 202) are combined. An exit pupil 400 is an area through which the light entering from the object side passes.

A schematic diagram showing a correspondence relation between the imaging element 107 and a pupil division in the embodiment is illustrated in FIG. 5. The light fluxes which passed through the different pupil partial areas of the first pupil partial area 501 and the second pupil partial area 502 enter each pixel of the imaging element at different angles and are received by the first focus detection pixel 201 and the second focus detection pixel 202 which are (2×1) divided, respectively. In the present embodiment, although an example of the case where the pupil area is divided into two areas in the horizontal direction is shown, it may be divided in the vertical direction in accordance with necessity.

The imaging element 107 includes the first focus detection pixel 201 for receiving the light flux which passes through the first pupil partial area 501 of the image forming optical system, and the second focus detection pixel 202 for receiving the light flux which passes through the second pupil partial area 502 of the image forming optical system different from the first pupil partial area 501. In FIG. 5, the first focus detection pixel 201 corresponds to the photoelectric conversion unit 301 and the second focus detection pixel 202 corresponds to the photoelectric conversion unit 302. The imaging element 107 includes the imaging pixel 200 for receiving the light flux which passes through the pupil area in which the first pupil partial area 501 and the second pupil partial area 502 of the image forming optical system are combined. In the imaging element 107 of the embodiment, each imaging pixel 200 is constructed by the first focus detection pixel 201 and the second focus detection pixel 202.

Such a construction that the imaging pixel 200, the first focus detection pixel 201, and the second focus detection pixel 202 are set to the individual pixels and the first focus detection pixel 201 and the second focus detection pixel 202 are partially arranged in a part of the array of the imaging pixel 200 may be used in accordance with necessity.

In the imaging device 100 of the present embodiment, a first focus signal is generated by collecting the light reception signals of the first focus detection pixels 201 of the respective pixels of the imaging element 107 and a second focus signal is generated by collecting the light reception signals of the second focus detection pixels 202 of the respective pixels. A focus detection is performed by using the generated first focus signal and second focus signal. By adding the signal of the first focus detection pixel 201 and the signal of the second focus detection pixel 202 every pixel of the imaging element 107, an imaging signal (picked-up image) of a resolution of the number N of effective pixels is generated.

Figure 6:
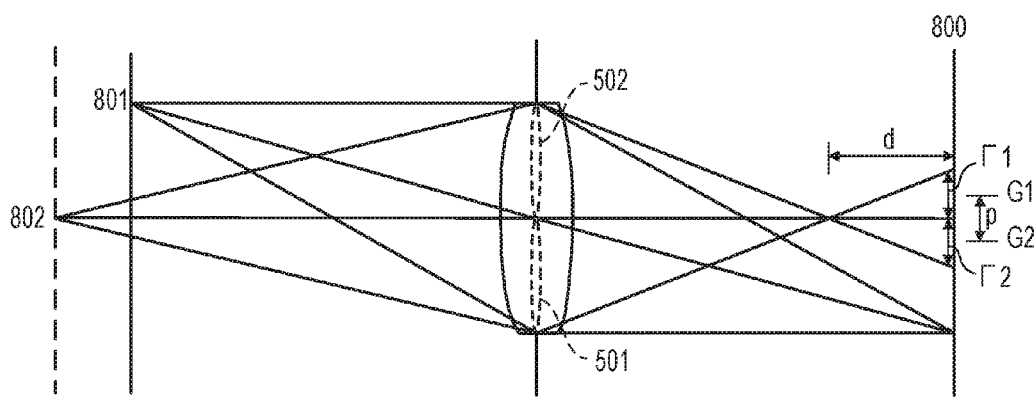
FIG. 6 is a schematic diagram illustrating a relation between a defocus amount and an image shift amount.

Subsequently, a relation between a defocus amount and an image shift amount of the first focus detection signal and the second focus detection signal obtained by the imaging element 107 will be described with reference to FIG. 6. FIG. 6 is a schematic diagram illustrating a relation between the defocus amount of the first focus detection signal and the second focus detection signal and the image shift amount between the first and second focus detection signals.

As illustrated in FIG. 6, an imaging element (not illustrated) is arranged on an imaging plane 800 and a case where the exit pupil of the image forming optical system is divided into two areas of the first pupil partial area 501 and the second pupil partial area 502 in a manner similar to FIGS. 4 and 5 is presumed.

A defocus amount d is defined as a distance in the optical axis direction from the image forming position of the object to the imaging plane 800. When the object is in a front focus state where the image forming position of the object is located on the object side than the imaging plane 800, the defocus amount d is expressed by a negative sign (d<0). When the object is in a rear focus state where the image forming position of the object is located on the side opposite to the object than the imaging plane, the defocus amount d is expressed by a positive sign (d>0). In the in-focus state where the image forming position of the object is located on the imaging plane 800 (in-focus position), d=0. In FIG. 6, for example, an object 801 is in the in-focus state (d=0) and an object 802 is in the front focus state (d<0). Both of the front focus state (d<0) and the rear focus state (d>0) are assumed to be the defocus state (|d|>0).

In the front focus state (d<0), among the light fluxes from the object 802, the light flux which passed through the first pupil partial area 501 is temporarily converged and, thereafter, is spread so as to have a width Γ1 around a position G1 of a center of gravity of the light flux as a center and becomes a blurred image on the imaging plane 800. The blurred image is received by the first focus detection pixel 201 constructing each pixel arranged in the imaging element and the first focus detection signal is generated. Therefore, the first focus detection signal is recorded at the position G1 of the center of gravity on the imaging plane 800 as such an object image that the object 802 is blurred so as to have the width Γ1. In association with an increase in magnitude |d| of the defocus amount d, the blur width Γ1 of the object image increases almost in proportion to it.

Similarly, among the light fluxes from the object 802, the light flux which passed through the second pupil partial area 502 is temporarily converged and, thereafter, is spread so as to have a width Γ2 around a position G2 of a center of gravity of the light flux as a center and becomes a blurred image on the imaging plane 800. The blurred image is received by the second focus detection pixel 202 constructing each pixel arranged in the imaging element and the second focus detection signal is generated. Therefore, the second focus detection signal is recorded at the position G2 of the center of gravity on the imaging plane 800 as such an object image that the object 802 is blurred so as to have the width Γ2. In association with an increase in magnitude |d| of the defocus amount d, the blur width Γ2 of the object image increases almost in proportion to it.

In association with an increase in magnitude |d| of the defocus amount d, a magnitude |p| of an image shift amount p (=difference (G1−G2) between the positions G1 of the centers of gravity of the light fluxes) of the object image between the first and second focus detection signals also increases almost in proportion to it.

In the rear focus state (d>0), although an image shift direction of the object image between the first and second focus detection signals is opposite to that in the front focus state, a situation similar to that mentioned above is also obtained.

Therefore, in association with an increase in magnitude of the defocus amount of the first and second focus detection signals or the defocus amount of the imaging signal obtained by adding the first and second focus detection signals, the magnitude of the image shift amount between the first and second focus detection signals increases.

Figure 7:
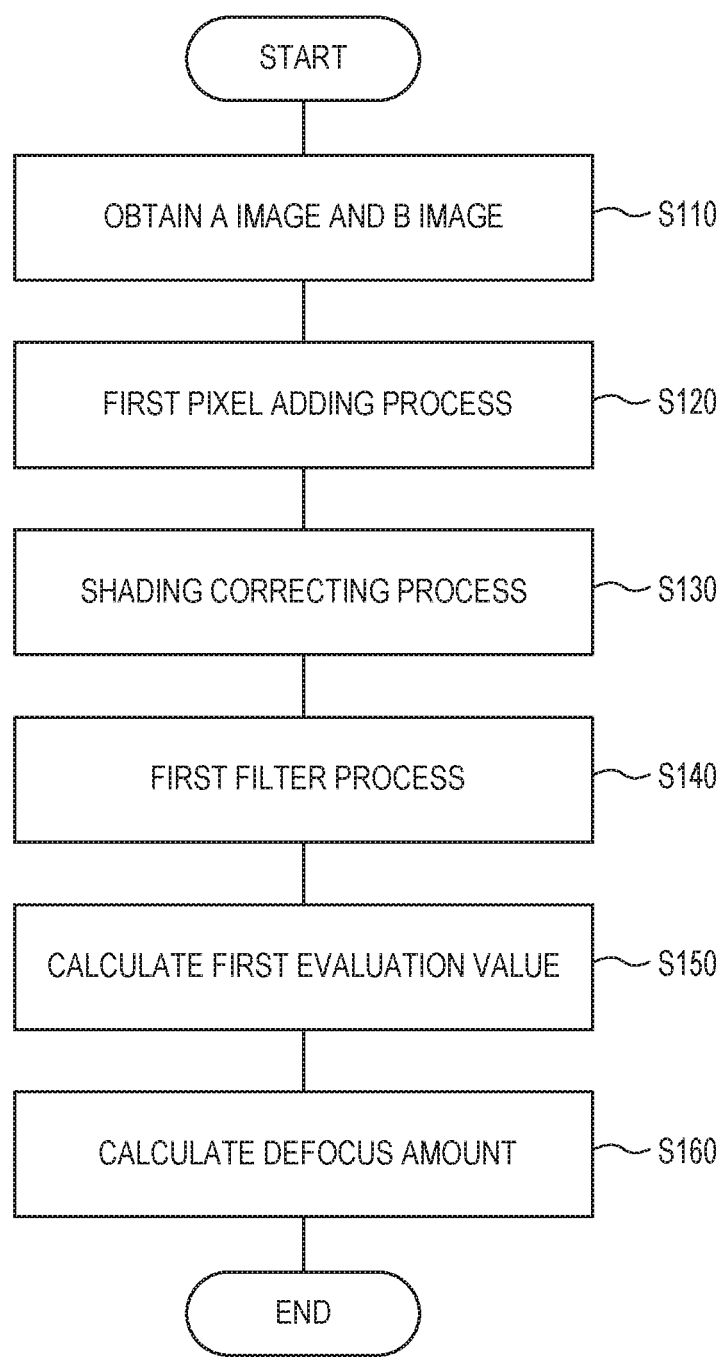
FIG. 7 is a flowchart illustrating a focus detection processing method in the imaging device according to the first embodiment of the present invention.
Figure 8:
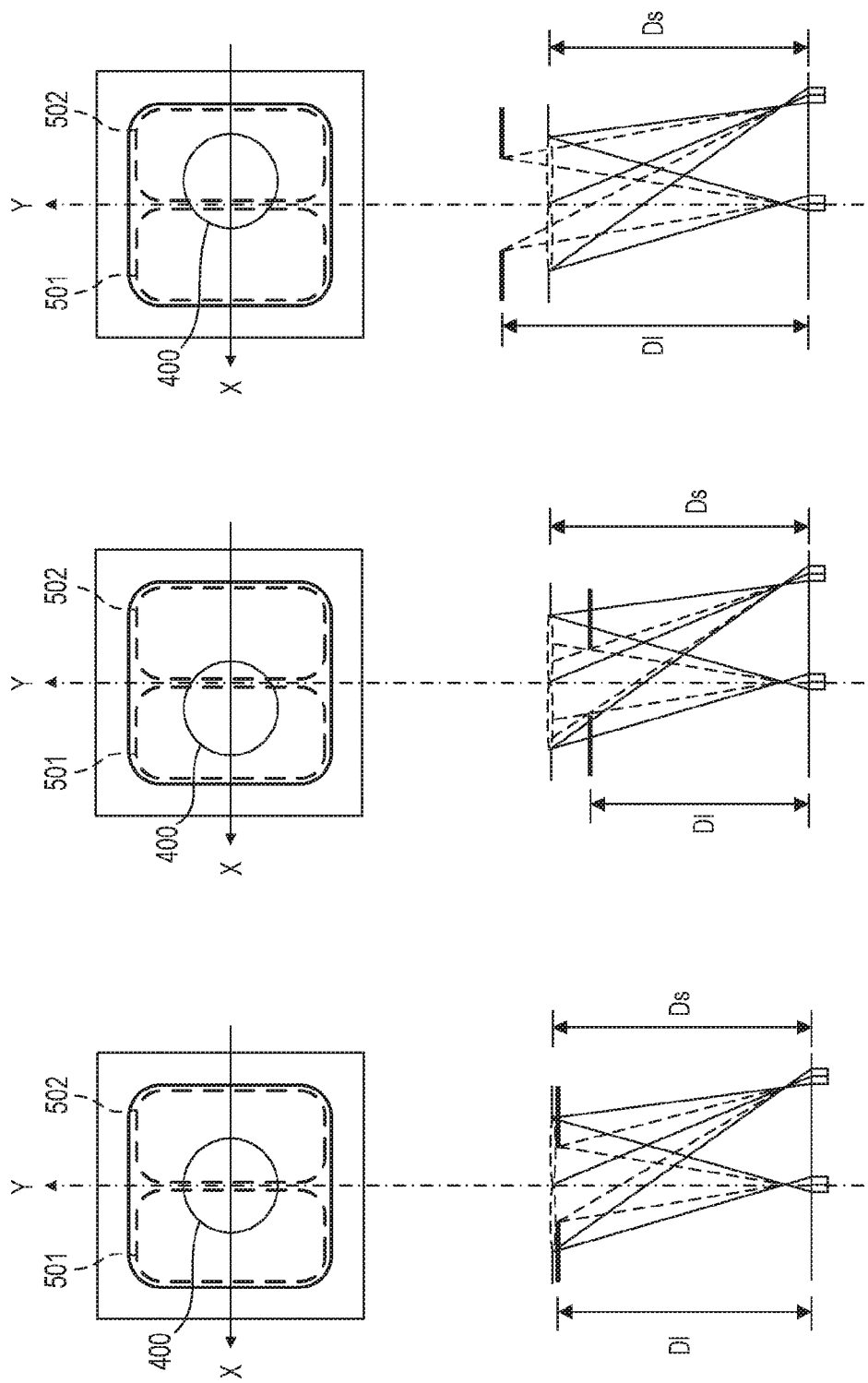
FIGS. 8A, 8B and 8C are schematic diagrams for describing a shading due to a pupil deviation of a first focus detection signal and a second focus detection signal.
Figure 9:
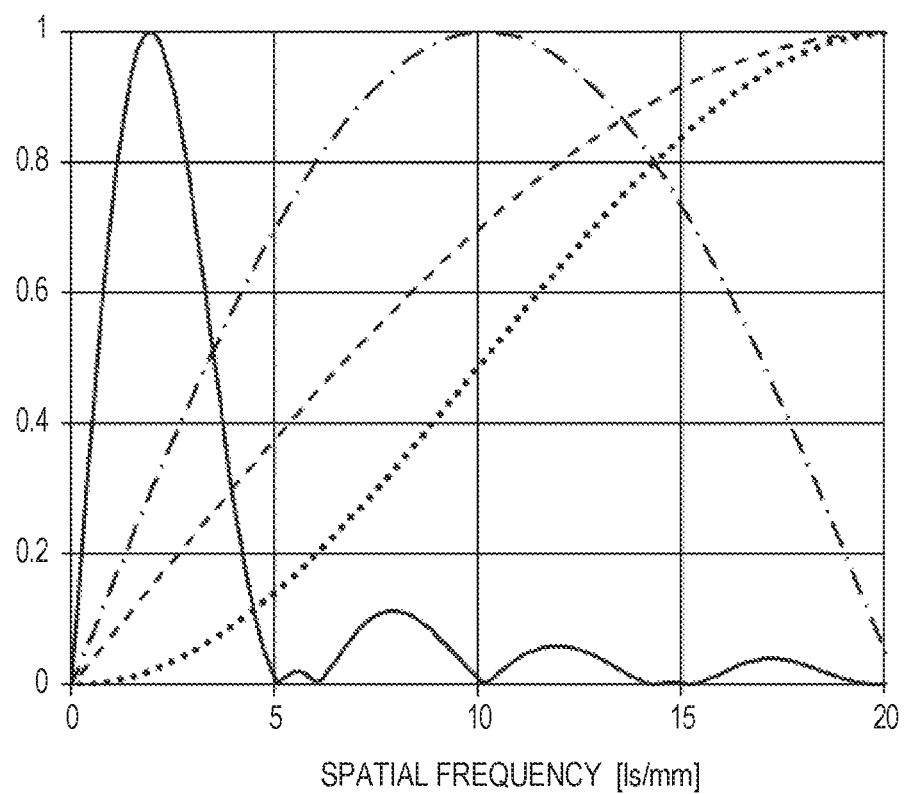
FIG. 9 is a diagram illustrating an example of a filter frequency band in an optical low pass filter of the imaging device according to the first embodiment of the present invention.

Subsequently, a focus detecting method of a phase difference system in the imaging device 100 according to the present embodiment will be described with reference to FIGS. 7 to 9. FIG. 7 is a flowchart illustrating the focus detection processing method in the imaging device according to the present embodiment. FIGS. 8A to 8C are schematic diagrams for describing a shading due to a pupil deviation of the first focus detection signal and the second focus detection signal. FIG. 9 is a diagram illustrating an example of a filter frequency band in an optical low pass filter of the imaging device according to the present embodiment.

In the first focus detection of the phase difference system, a positional relation between the first focus detection signal and the second focus detection signal is relatively shifted, a correlation amount (first evaluation value) showing a degree of coincidence of the signals is calculated, and an image shift amount is detected from such a shift amount that a good correlation (coincidence degree of the signals) is obtained is detected. In consideration of such a relation that the magnitude of the image shift amount between the first focus detection signal and the second focus detection signal increases in association with an increase in magnitude of the defocus amount of the imaging signal, the focus detection is performed by converting the image shift amount into a defocus amount.

The flowchart for the first focus detection processing method in the imaging device 100 according to the present embodiment is illustrated in FIG. 7. The operation in FIG. 7 is performed by a focus detection signal generating unit, the imaging element 107 as an acquisition unit, the image processing circuit 125, and the CPU 121 of the imaging device 100 according to the present embodiment.

First, in step S110, a focus detection area for obtaining a signal to perform a focus adjustment is set into an effective pixel area of the imaging element 107. By the focus detection signal generating unit, the first focus detection signal (A image) is generated from the light reception signal of the first focus detection pixel 201 in the focus detection area and the second focus detection signal (B image) is generated from the light reception signal of the second focus detection pixel 202 in the focus detection area.

Subsequently, in step S120, an adding process of three pixels is performed in the column direction to the first focus detection signal and the second focus detection signal, respectively, and further, a Bayer (RGB) adding process is performed to convert RGB signals into a luminance Y signal. A first pixel adding process is performed by combining those two adding processes.

Subsequently, in step S130, a shading correcting process (optical correcting process) is performed to the first focus detection signal and the second focus detection signal, respectively.

The shading due to a pupil deviation of the first focus detection signal and the second focus detection signal will be described here with reference to FIGS. 8A to 8C. FIGS. 8A to 8C are diagrams illustrating a relation among the first pupil partial area 501 of the first focus detection pixel 201, the second pupil partial area 502 of the second focus detection pixel 202, and the exit pupil 400 of the image forming optical system at a peripheral image height of the imaging element.

FIG. 8A illustrates a case where an exit pupil distance D1 of the image forming optical system and a set pupil distance Ds of the imaging element are equal. In this case, the exit pupil 400 of the image forming optical system is almost uniformly pupil-divided to the first pupil partial area 501 and the second pupil partial area 502.

On the other hand, when the exit pupil distance D1 of the image forming optical system is shorter than the set pupil distance Ds of the imaging element as illustrated in FIG. 8B, at the peripheral image height of the imaging element, a pupil deviation between the exit pupil of the image forming optical system and an entrance pupil of the imaging element occurs and the exit pupil 400 of the image forming optical system is unevenly pupil-divided. Similarly, when the exit pupil distance D1 of the image forming optical system is longer than the set pupil distance Ds of the imaging element as illustrated in FIG. 8C, at the peripheral image height of the imaging element, a pupil deviation between the exit pupil of the image forming optical system and the entrance pupil of the imaging element occurs and the exit pupil 400 of the image forming optical system is unevenly pupil-divided. Since the pupil division becomes uneven at the peripheral image height, an intensity of the first focus detection signal and an intensity of the second focus detection signal become uneven. Consequently, such a phenomenon that the intensity of one of the first focus detection signal and the second focus detection signal increases and the intensity of the other signal decreases, that is, a shading occurs.

In step S130, a first shading correction coefficient of the first focus detection signal and a second shading correction coefficient of the second focus detection signal are generated in accordance with the image height of the focus detection area, an F value of an imaging lens (image forming optical system), and the exit pupil distance, respectively. By multiplying the first focus detection signal by the first shading correction coefficient and by multiplying the second focus detection signal by the second shading correction coefficient, the shading correcting process (optical correcting process) of the first and second focus detection signals is performed.

In the first focus detection of the phase difference system, the defocus amount is detected based on the correlation (coincidence degree of the signals) between the first and second focus detection signals. When the shading due to the pupil deviation occurs, there is a case where the correlation (coincidence degree of the signals) between the first and second focus detection signals decreases. Therefore, in the first focus detection of the phase difference system, it is desirable to improve the correlation (coincidence degree of the signals) between the first and second focus detection signals and perform the shading correcting process (optical correcting process) in order to improve the focus detecting performance.

Subsequently, in step S140, a first filter process is performed to the first and second focus detection signals. An example of a pass band in the first filter process is illustrated by a solid line in FIG. 9. In the present embodiment, in order to perform the focus detection in the large defocus state by the first focus detection of the phase difference system, the device is constructed in such a manner that the pass band in the first filter process includes a low frequency band. In accordance with necessity, when performing the focus adjustment in a range from the large defocus state to the small defocus state, the pass band in the first filter process at the time of the first focus detection may be adjusted to a higher frequency band in accordance with the defocus state as shown by, for example, an alternate long and short dash line in FIG. 9.

Subsequently, in step S150, a first shift process for relatively shifting the first focus detection signal and the second focus detection signal after the first filter process in the pupil dividing direction is performed and a correlation amount (first evaluation value) showing the coincidence degree of the signals is calculated.

It is assumed that a k-th first focus detection signal after the first filter process is set to A(k), a k-th second focus detection signal is set to B(k), and a range of the number k corresponding to the focus detection area is set to W. Now, assuming that a shift amount by the first shift process is set to s1 and a shift range of the shift amount s1 is set to r1, a correlation amount (first evaluation value) COR can be calculated by the following equation.

$$COR(s_1) = \sum_{k \in W} |A(k) - B(k - s_1)|, s_1 \in \Gamma_1$$

By the first shift process of the shift amount s1, the k-th first focus detection signal A(k) and a (k−s1)-th second focus detection signal B(k−s1) are subjected to a subtracting process so as to correspond to each other and a shift subtraction signal is generated. An absolute value of the generated shift subtraction signal is calculated, a sum of values of the signals of the number k in the range W corresponding to the focus detecting area is obtained, and a correlation amount (first evaluation value) COR(s1) is calculated. A correlation amount (first evaluation value) calculated every row may be added every shift amount with respect to a plurality of rows.

Subsequently, in step S160, a shift amount of such a real number value that the correlation amount becomes the minimum value is calculated by a subpixel arithmetic operation from the correlation amount (first evaluation value) calculated in step S150, and is set to an image shift amount p1. The image shift amount p1 is multiplied by the image height of the focus detection area and a first conversion coefficient K1 according to the F value of the imaging lens (image forming optical system) and the exit pupil distance, and the defocus amount is calculated.

Figure 10:
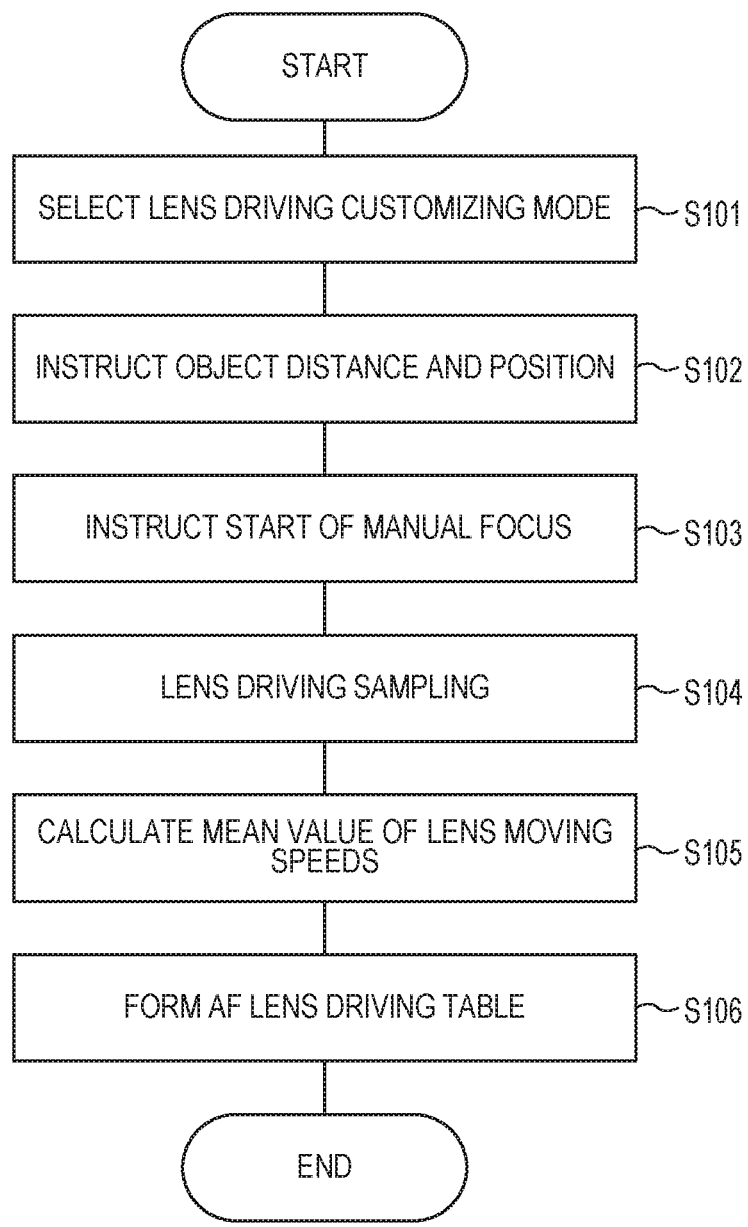
FIG. 10 is a flowchart illustrating a method of driving the imaging device according to the first embodiment of the present invention.
Figure 11:
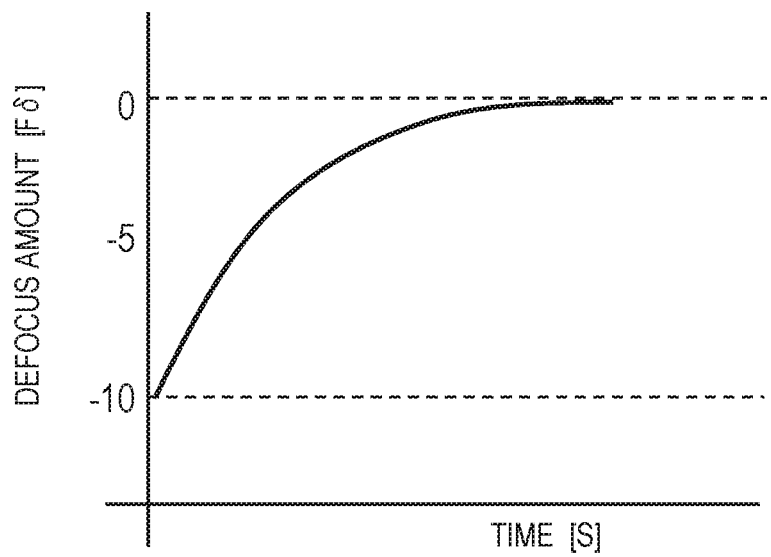
FIG. 11 is a graph illustrating an example of a change of the defocus amount at the time of the manual focus.
Figure 12:
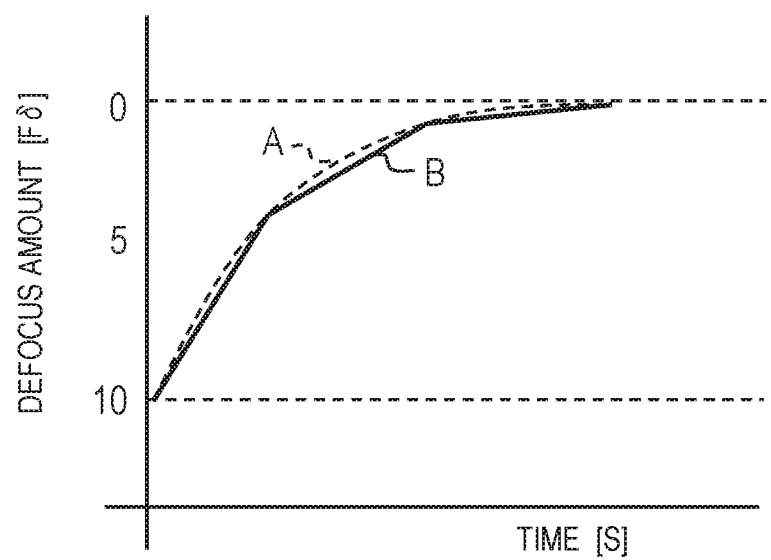
FIG. 12 is a graph illustrating an example of a change of the defocus amount in the method of driving the imaging device according to the first embodiment of the present invention.

Subsequently, a method of driving the imaging device according to the present embodiment will be described with reference to FIGS. 10 to 12. FIG. 10 is a flowchart illustrating the method of driving the imaging device according to the present embodiment. FIG. 11 is a graph illustrating an example of a change of the defocus amount at the time of the manual focus. FIG. 12 is a graph illustrating an example of a change of the defocus amount in the method of driving the imaging device according to the present embodiment.

First, when the user wants to customize the lens driving at the time of AF, he selects a mode for customizing the lens driving from a UI (user interface) of the camera (step S101). The mode selection may be performed through the touch panel of the display device 131 or may be performed by the operation switch 132. The mode for customizing the lens driving is a mode for the user to input details of the lens driving by one or a plurality of methods and customize the lens driving at the time of AF.

As a method of customizing the lens driving at the time of AF, several methods can be mentioned as examples as shown in embodiments, which will be described hereinafter. In the present embodiment, a method of customizing the lens driving at the time of AF on the basis of results obtained by sampling a moving speed of the lens and the defocus amount when the user has manually performed the focus adjustment (MF) will be described.

When the user selects the lens driving customizing mode, in subsequent step S102, an instruction to the user for setting the object to a position of a predetermined distance and setting the camera so that the object is located at the center of the image height is displayed on the camera. The user sets the position of the camera for the object in accordance with the instruction of the camera.

Subsequently, in step S103, an instruction to the user for making a focus adjustment to the object by MF is displayed. The user starts the focus adjustment by MF at a desired speed in accordance with the instruction of the camera.

The lens driving by MF which is performed by the user is sampled in subsequent step S104. That is, for a period of time from a point of time when the user disposed the camera so as to face the object to a point of time when the user determines that the lens has been in-focused to the object, a change in moving speed of the lens is recorded into the camera together with a change in detected defocus amount. It can be regarded that the lens moving speed and the detected defocus amount are recorded in association with each other. At this time, the CPU 121 functions as a recording unit.

FIG. 11 is an example of a graph illustrating a change of the detected defocus amount sampled in step S104 and obtained when the user has in-focused by MF. It is now assumed that the detected defocus amount in a distance measurement frame at the time when the user has disposed the camera so as to face the object is equal to −10 [Fδ]. The unit [Fδ] of an axis of ordinate used here is such a value that the detected defocus amount is divided by the F value and a value of a size δ of a permissible circle of confusion to be standardized. The unit [Fδ] becomes an index of a blur amount. By converting the defocus amount into the [Fδ] unit, it can be uniformly handled as a blur amount irrespective of the F value and the focal distance. The detected defocus amount calculated as mentioned above and the lens moving speed at that time are recorded at a value near a range from −10 [Fδ] to 0 [Fδ], that is, until a point of time when the user determines that the lens has been in-focused to the object.

Although [Fδ] is used as a unit of the defocus amount in the present embodiment, another unit such as [mm] or the like may be used as a unit of the defocus amount.

There is a case where a sampling frequency upon recording depends on a frame rate at which the sensor obtains the signal and there is also a case where it depends on a time required for calculation of a distance measurement arithmetic operation. In the present embodiment, it is assumed that the frame rate of the sensor is equal to 30 Hz and the defocus amount is detected at a period of 30 Hz.

Subsequently, in steps S105 and S106, an AF lens driving table is formed on the basis of the lens moving speed and the detected defocus amount at the time of MF which have been sampled as mentioned above. At this time, the CPU 121 functions as an information generating unit.

The AF lens driving table which is used in the present embodiment is a table having information (lens driving information) of the lens driving speed corresponding to the detected defocus amount. In the AF lens driving table, the lens driving speed is specified every defocus amount of a predetermined range. Naturally, the larger the number (hereinbelow, referred to as "table stage number") of correspondence relations between the detected defocus amount and the lens driving speed included in one table is, the more the change in defocus amount approaches the original curve by MF. Since a memory capacity of the imaging device is limited, it is desirable that the table stage number is properly set in accordance with the memory capacity of the imaging device. It is also possible to construct in such a manner that the user can set the table stage number and a range of the detected defocus amount which specifies each stage. In the present embodiment, an example in which the table stage number is set to 4 will be described.

TABLE 1 is an example of the AF lens driving table showing the correspondence relation between the detected defocus amount and the lens driving speed which are used in the embodiment.

TABLE 1

| REMAINING DEFOCUS AMOUNT | LENS DRIVING SPEED [mm/s] |
|---|---|
| <2 Fδ | 0.5 |
| <5 Fδ | 1 |
| <10 Fδ | 10 |
| <∞ | 50 |

According to the AF lens driving table of TABLE 1, the lens driving speed can be set at the following four stages: that is, when the absolute value of the detected defocus amount is not less than 10 [Fδ]; when it is not less than 5 [Fδ] and is less than 10 [Fδ]; when it is not less than 2 [Fδ] and is less than 5 [Fδ]; and when it is less than 2 [Fδ].

First, in step S105, a lens driving speed which is used at the time of AF is calculated. The lens driving speed which is used at the time of AF is calculated on the basis of the detected defocus amount which is sampled in step S104 and the lens moving speed at that time.

As a lens driving speed which is used at the time of AF, a mean value of the lens moving speeds sampled in each defocus range in the table can be used. For example, a mean value of the lens moving speeds sampled in a range from 5 [Fδ] to 10 [Fδ] at the time of AF is used as a lens driving speed in the range from 5 [Fδ] to 10 [Fδ]. Similarly, also with respect to the lens driving speeds in other defocus ranges, a mean value of the lens moving speed at the time of MF in each range is used.

Subsequently, in step S106, the mean value of the lens moving speeds in each defocus range calculated as mentioned above is input to the table in correspondence to the defocus range, thereby forming the AF lens driving table.

An example of the AF lens driving table formed as mentioned above is shown in TABLE 1 mentioned above. In this table, when the detected defocus amount is not less than 10 Fδ, the lens driving speed is equal to 50 mm/s; when it lies within a range from 5 Fδ to 10 Fδ, the lens driving speed is equal to 10 mm/s; when it lies within a range from 2 Fδ to 5 Fδ, the lens driving speed is equal to 1 mm/s; and when it is less than 2 Fδ, the lens driving speed is equal to 0.5 mm/s.

The AF lens driving table may be formed from the lens driving speeds sampled at the time of MF of one time or, by performing MF a plurality of number of times, such a table may be formed from the mean value of the lens driving speeds sampled at the time of trial of each MF.

A state of a change in defocus amount at the time when AF has been performed at an object distance similar to that upon sampling on the basis of the AF lens driving table formed as mentioned above is illustrated in FIG. 12. In the diagram, a broken line A shows a lens moving curve of MF at the time when the sampling has been performed and a solid line B shows a lens driving curve at the time when AF has been performed by using the AF lens driving table formed based on a result of the sampling.

By performing AF by using the AF lens driving table formed by using the method of the present embodiment as mentioned above, the user can move the lens in a manner similar to a case where a state where the lens is moved by MF has been simulated.

The lens driving speed mentioned here denotes a moving speed in the optical axis direction of the focus position on an image plane. A speed of the lens itself is a speed obtained by multiplying the moving speed of the focus position on the image plane by a coefficient which differs dependence on the lens.

The lens driving speed has a limit value every lens and a speed of a predetermined speed or higher cannot be obtained from a viewpoint of a mechanical structure or the like. Similarly, a speed of a predetermined speed or less cannot be obtained. Although the lens driving speed is instructed by the user by MF in the present embodiment, if the driving speed at the time of MF is not lower than an upper limit speed or is not higher than a lower limit speed, the AF lens driving table cannot be formed. In such a case, when the driving speed exceeds the upper limit speed, by setting the upper limit speed, and when the driving speed is less than the lower limit speed, by setting the lower limit speed, the AF lens driving table can be formed.

In this manner, according to the present embodiment, since the AF lens driving table which specifies the relation between the defocus amount and the lens driving speed is prepared and the lens is in-focused to the object by driving the lens on the basis of such a table, various kinds of lens driving which are desired by the user can be easily realized.

Second Embodiment

An imaging device and a method of driving the imaging device according to a second embodiment of the present invention will now be described with reference to FIGS. 13 to 15. Component elements and steps similar to those in the imaging device and the method of driving the same according to the first embodiment illustrated in FIGS. 1 to 12 are designated by the same reference numerals and step numbers and their description is omitted or will be simply made.

Figure 13:
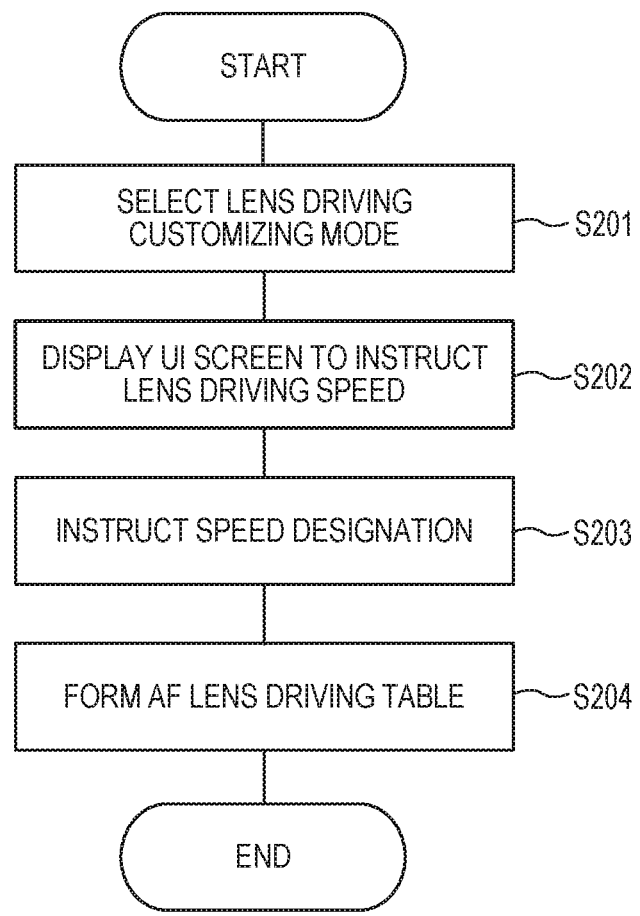
FIG. 13 is a flowchart illustrating a method of driving an imaging device according to a second embodiment of the present invention.

FIG. 13 is a flowchart illustrating the method of driving the imaging device according to the present embodiment. FIGS. 14 and 15 are diagrams illustrating UI display screens which are used in the method of driving the imaging device according to the present embodiment.

In the first embodiment, the AF lens driving table is formed on the basis of the lens moving speed at the time when the user has performed MF. This method is a very effective method to the user and professional cameraman who are usually familiar with the MF operation because AF can be performed in a manner similar to MF. However, to the amateur user and the like who are not familiar with the MF operation, it becomes a difficult operation on the contrary and there is also a risk that a desired table cannot be formed. Therefore, in the present embodiment, such an imaging device that even amateur user and the like can easily form an AF lens driving table and a method of driving the same will be described.

When the user wants to customize the lens driving at the time of AF, he selects the mode for customizing the lens driving from the camera UI in a manner similar to that in the first embodiment (step S201).

When the user selects the lens driving customizing mode, in subsequent step S202, a UI screen to instruct a lens driving speed is displayed to the display device 131 of the camera.

Figure 14:
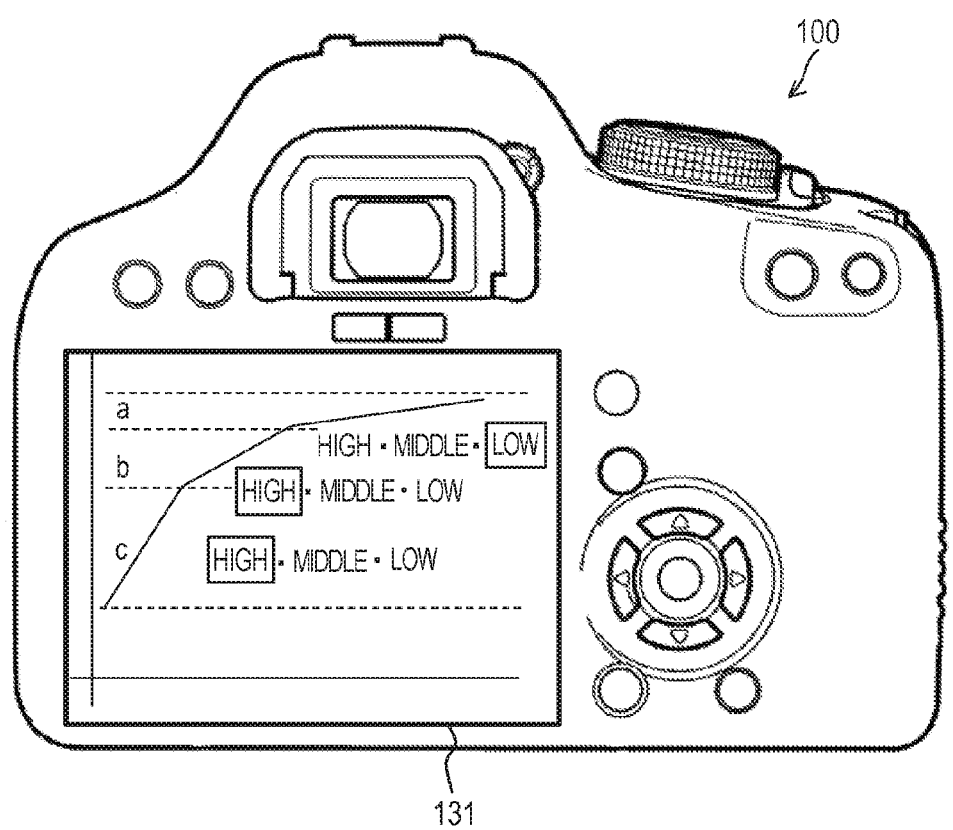
FIG. 14 is a diagram illustrating an example of a UI display screen which is used in the method of driving the imaging device according to the second embodiment of the present invention.
Figure 15:
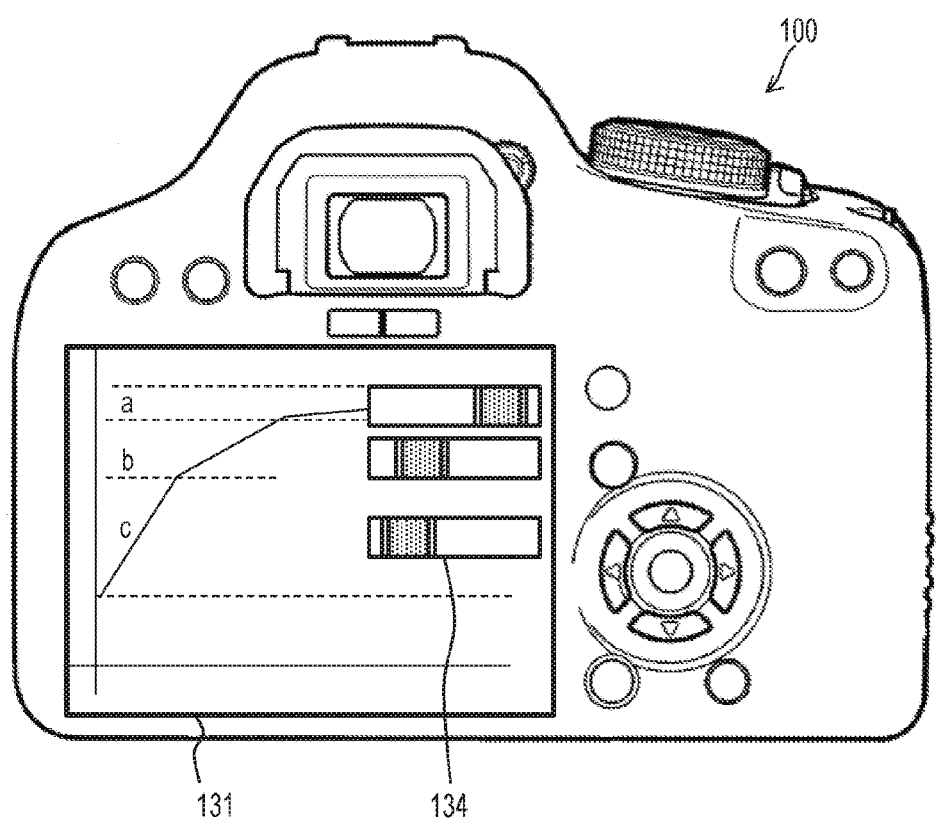
FIG. 15 is a diagram illustrating another example of a UI display screen which is used in the method of driving the imaging device according to the second embodiment of the present invention.

FIG. 14 illustrates an example of a UI display screen for instructing the lens driving speed by the user. In a rear liquid crystal display portion (display device 131) of the camera (imaging device 100) illustrated in FIG. 14, a curve of the lens driving speed in which an axis of abscissa indicates a time and an axis of ordinate indicates a defocus amount as illustrated in FIG. 12 is shown. In the UI illustrated in FIG. 14, the defocus amount on the axis of ordinate is divided into three intervals a, b, and c. The lens driving speed in each interval can be selected from "high·middle·low". Although an example in which the lens driving speed is selected from three kinds of speeds has been shown here for simplicity of explanation, the number of selection items is not limited to 3 but may be set to an arbitrary number so long as the lens driving speed can be selected from a plurality of kinds of speeds. As a UI for instructing the lens driving speed by the user, such a UI that the lens driving speed is selected by a UI such as a slide bar 134 or the like as illustrated in FIG. 15 may be used.

Subsequently, in step S203, in the UI illustrated in FIG. 14, the user selects the lens driving speed in each of the intervals a, b, and c from "high·middle·low". When the UI illustrated in FIG. 15 is used, the slide bars 134 corresponding to the intervals a, b, and c are moved, thereby setting the lens driving speed in each interval to a desired value.

In the case of using the UI illustrated in FIG. 14, it is sufficient that set values of the lens driving speeds of at least the number as many as the number of selection items on the UI screen are held in the camera and the lens driving speed corresponding to the selected item is used as an AF lens driving table. In the case of using the UI of the slide bars illustrated in FIG. 15, it is sufficient that data of the lower limit value and the upper limit value of the lens driving speed is held, a position instructed by the user by each slide bar 134 from the speed range between the upper limit value and the lower limit value is converted by a linear interpolation, and the speed is calculated.

Subsequently, in step S204, an AF lens driving table is formed on the basis of the lens driving speed designated by the user. By using such the AF lens driving table at the time of AF, the user's desired lens driving can be realized.

As mentioned above, according to the present embodiment, by the simple operation using the camera UI, the AF lens driving table which realizes the user's desired lens driving can be easily formed. By driving the lens on the basis of such a table, the user's desired lens driving can be easily realized.

Third Embodiment

An imaging device and a method of driving the imaging device according to a third embodiment of the present invention will now be described with reference to FIGS. 16 to 18. Component elements and steps similar to those in the imaging device and its driving method according to the first and second embodiments illustrated in FIGS. 1 to 15 are designated by the same reference numerals and step numbers and their description is omitted or will be simply made.

Figure 16:
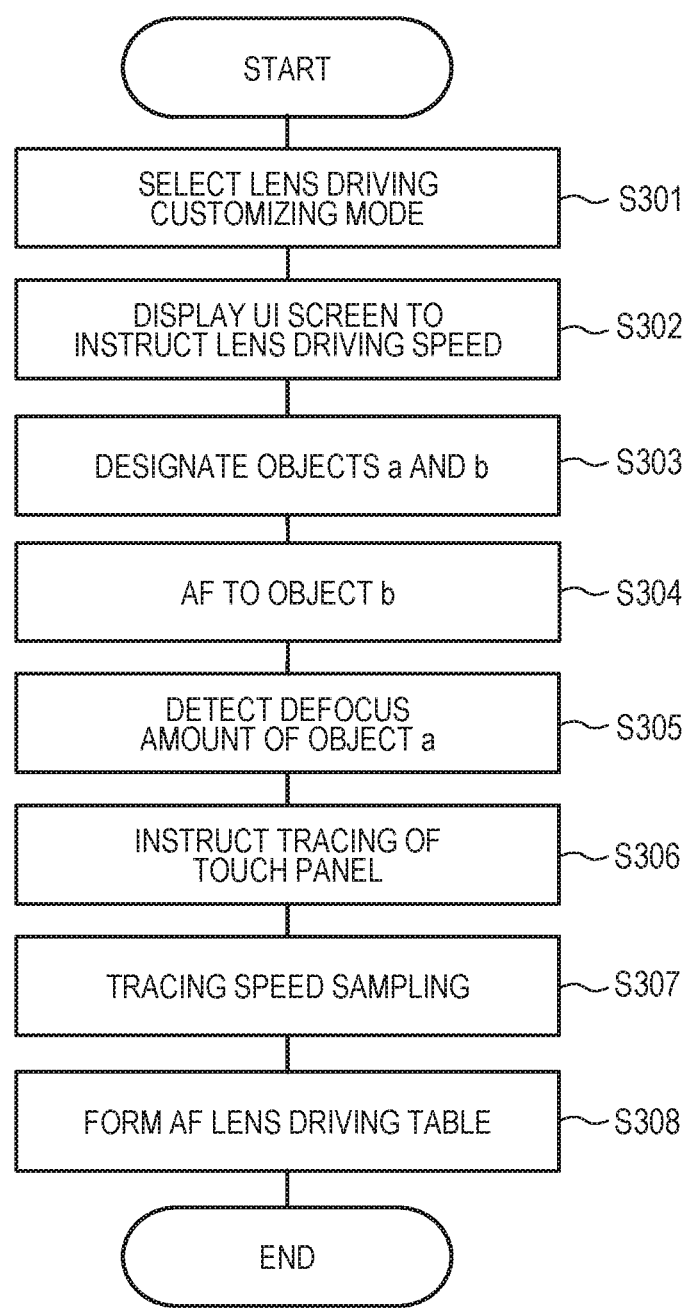
FIG. 16 is a flowchart illustrating a method of driving an imaging device according to a third embodiment of the present invention.
Figure 17:
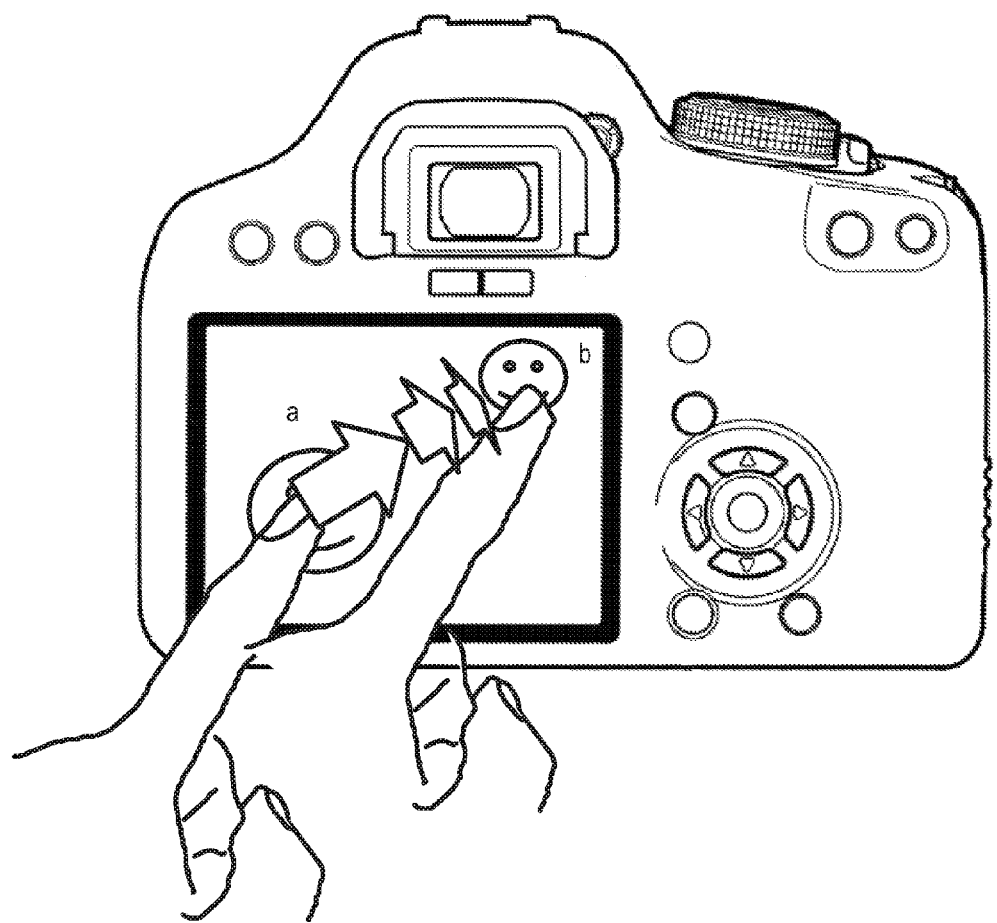
FIG. 17 is a diagram illustrating an example of a UI display screen which is used in the method of driving the imaging device according to the third embodiment of the present invention.

FIG. 16 is a flowchart illustrating the method of driving the imaging device according to the present embodiment. FIG. 17 is a diagram illustrating an example of a UI display screen which is used in the method of driving the imaging device according to the present embodiment. FIG. 18 is a diagram illustrating a relation between a motion of a finger and a change of a defocus amount in the method of driving the imaging device according to the present embodiment.

In the present embodiment, the method of instructing the lens driving speed at the time of AF by the touch operation to the touch panel is shown.

First, when the user wants to customize the lens driving at the time of AF, he selects the mode for customizing the lens driving from the camera UI (step S301) in a manner similar to that in the first and second embodiments.

When the user selects the lens driving customizing mode, in subsequent step S302, a UI screen to instruct the lens driving speed is displayed to the display device 131 of the camera.

Subsequently, in step S303, the user sets two objects on the UI screen displayed to the display device 131. In this instance, as illustrated in FIG. 17, an image including objects a and b as human faces is displayed on the display device 131. It is assumed that the user designated the objects a and b as two objects. The designation of the objects a and b can be performed by a method whereby the user performs the touch operation to the objects a and b displayed to the display device 131.

The two objects which are selected by the user correspond to the object which has been in-focused at the start of AF and the object which is in-focused at the end of AF. In this instance, it is assumed that the lens has been in-focused to the object a at the start of AF and, after the lens is driven at a user's desired speed, the lens is in-focused to the object b.

Subsequently, in step S304, the camera adjusts a focus to the object b by using AF.

Subsequently, in step S305, the camera detects a defocus amount in the object a at the time when the lens is focused to the object b. In this manner, the camera obtains the positions of the objects a and b and the defocus amount in the object a.

Subsequently, in step S306, an instruction to the user for tracing the touch panel from the object a to the object b by the finger is displayed to the display device 131 or the like of the camera.

Subsequently, in step S307, the user moves the finger on the touch panel from the object a to the object b in response to the instruction in step S306 (refer to FIG. 17). It is assumed that, for example, the finger motion of the user is decelerated as the finger approaches the object b, the speed finally becomes zero, and the finger stops at the position of the object b. The camera which detected the user's operation records a speed change of the finger which traces on the touch panel.

Figure 18:
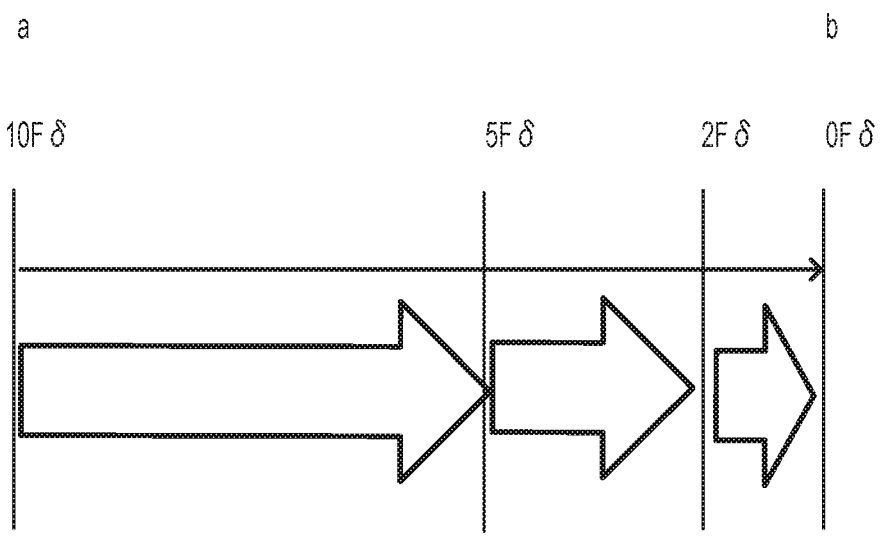
FIG. 18 is a diagram illustrating a relation between a motion of a finger and a change of a defocus amount in the method of driving the imaging device according to the third embodiment of the present invention.

A relation between the speed of the motion of the finger at this time and the defocus amount is illustrated in FIG. 18. It is assumed that the defocus amount in the object a serving as a start point is equal to, for example, 10 [Fδ] from the defocus amount obtained in step S304. The defocus amount in the object b is equal to almost 0 [Fδ] since the user has already in-focused.

Subsequently, in step S308, the AF lens driving table is formed. In this instance, as an example, an AF lens driving table in which the table stage number is equal to 4 similar to that in the first embodiment is presumed. In this table, as shown in TABLE 1, the lens driving speed is set in each of the defocus ranges where: the defocus amount is not more than 10 [Fδ]; it is not more than 5 [Fδ]; and it is not more than 2 [Fδ]. As illustrated in FIG. 18, a moving speed of the finger in each defocus amount is converted into a lens driving speed and set into the table.

In order to convert the finger moving speed into the lens driving speed, it is sufficient that a table having a correspondence relation between the lens driving speed and the finger moving speed is preliminarily held in the camera.

As mentioned above, according to the present embodiment, by tracing on the touch panel by the finger toward the object by the user, the AF lens driving table which realizes the user's desired lens driving can be easily formed. By driving the lens on the basis of such a table, the user's desired lens driving can be easily realized.

Modifications

The present invention is not limited to the foregoing embodiments but many various modifications are possible.

For example, although the forming method of the AF lens driving tables has been shown in detail in the foregoing first to third embodiments, a plurality of AF lens driving tables which are formed by the above method may be held in the camera. For example, three kinds of AF lens driving tables such as "lens driving table A", "lens driving table B", and "lens driving table C" can be stored in the camera. By selecting one of the lens driving tables A, B, and C in accordance with a scene which is photographed by the user, the lens driving according to the scene can be performed.

Although the example in which the imaging plane phase difference AF system is used as an acquisition unit has been shown in the foregoing first to third embodiments, the acquisition unit is not limited to such a unit. For example, the focus detection may be performed by using a dedicated focus detecting sensor instead of the imaging plane or by using a DFD (Depth From Defocus) system. That is, the system of the present invention can be applied to any acquisition unit so long as it can detect the defocus amount. The AF lens driving tables can be formed by the methods shown in the foregoing first to third embodiments by using the defocus amounts and the lens driving speeds detected in every system.

Although the case of driving the lens from a predetermined defocus position to the in-focus position has been shown in the foregoing first to third embodiments, the lens may be driven from the in-focus position to a predetermined defocus position by using a similar method.

The construction of the imaging device mentioned in the foregoing first embodiment is shown as an example and the imaging device to which the invention can be applied is not limited to the construction illustrated in FIG. 1.

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-036804 filed on Feb. 26, 2015, which is hereby incorporated by reference herein in its entirety.

What is claimed is:

1. An imaging device comprising:
an acquisition unit configured to acquire a defocus amount for an optical image which is obtained by an imaging element;
a recording unit configured to record a driving speed of a lens in association with the defocus amount in response to an instruction from a user, wherein the lens is controlled, for adjusting a position at which the optical image is focused, by a lens driving unit;
an information generating unit configured to generate lens driving information specifying a relation between the defocus amount and the driving speed of the lens based on information of the driving speed recorded by the recording unit; and a control unit configured to control the lens driving unit so that the lens is moved to a position at which the optical image is in-focused to the object at a predetermined speed specified in the lens driving information as a driving speed corresponding to the defocus amount acquired by the acquisition unit.

2. The imaging device according to claim 1, wherein the recording unit records a change of a moving speed of the lens when the user manually moves the lens together with a change of the defocus amount.

3. The imaging device according to claim 1, wherein the recording unit records a moving speed of the lens set by the user through a UI in accordance with the defocus amount.

4. The imaging device according to claim 1, wherein the recording unit calculates and records a moving speed of the lens based on a speed of tracing a touch panel by the user.

5. The imaging device according to claim 1, comprising a plurality of the lens driving information, wherein the control unit controls the lens driving unit by using one of the lens driving information selected by the user from the plurality of lens driving information.

6. The imaging device according to claim 1, wherein the lens driving information specifies the driving speed of the lens every the defocus amount in a predetermined range.

7. The imaging device according to claim 1, wherein the acquisition unit calculates the defocus amount based on a shift amount between images obtained by a pupil division.

8. A method of driving an imaging device including an imaging element configured to obtain an image of an object from an optical image of the object, a lens driving unit configured to control a lens for adjusting a position at which the optical image is focused, and an acquisition unit configured to acquire a defocus amount of the optical image, the method comprising:

recording a driving speed of the lens in association with the defocus amount in response to an instruction from a user;

generating lens driving information specifying a relation between the defocus amount and the driving speed based on information of the recorded driving speed; and acquiring the defocus amount of the optical image by the acquisition unit and moving the lens to a position at which the optical image is in-focused to the object at a predetermined speed specified in the lens driving information as a driving speed of the lens corresponding to the detected defocus amount.

9. A non-transitory computer-readable storage medium storing a program for controlling an imaging device including an imaging element configured to obtain an image of an object from an optical image of the object, a lens driving unit configured to control a lens for adjusting a position at which the optical image is focused, and an acquisition unit configured to acquire a defocus amount of the optical image, wherein the program causes a computer to execute:

recording a driving speed of the lens in association with the defocus amount in response to an instruction from a user;

generating lens driving information specifying a relation between the defocus amount and the driving speed based on information of the recorded driving speed; and acquiring the defocus amount of the optical image by the acquisition unit and moving the lens to a position at which the optical image is in-focused to the object at a predetermined speed specified in the lens driving information as a driving speed of the lens corresponding to the detected defocus amount.

* * * * *